(12) United States Patent
Lee et al.

(10) Patent No.: US 12,506,228 B2
(45) Date of Patent: Dec. 23, 2025

(54) BATTERY MODULE

(71) Applicant: LG ENERGY SOLUTION, LTD., Seoul (KR)

(72) Inventors: Hanyoung Lee, Daejeon (KR); Kyungmin Lee, Daejeon (KR); Bum Young Jung, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 557 days.

(21) Appl. No.: 17/296,380

(22) PCT Filed: Oct. 7, 2019

(86) PCT No.: PCT/KR2019/013121
§ 371 (c)(1),
(2) Date: May 24, 2021

(87) PCT Pub. No.: WO2020/122386
PCT Pub. Date: Jun. 18, 2020

(65) Prior Publication Data
US 2022/0037744 A1    Feb. 3, 2022

(30) Foreign Application Priority Data
Dec. 13, 2018 (KR) .................. 10-2018-0161298

(51) Int. Cl.
*H01M 50/521* (2021.01)
*H01M 50/211* (2021.01)
(Continued)

(52) U.S. Cl.
CPC ....... *H01M 50/521* (2021.01); *H01M 50/211* (2021.01); *H01M 50/50* (2021.01);
(Continued)

(58) Field of Classification Search
CPC .. H01M 50/521; H01M 50/211; H01M 50/50; H01M 50/552; H01M 50/574;
(Continued)

(56) References Cited

U.S. PATENT DOCUMENTS 5,406,245 A * 4/1995 Smith .................. H01H 33/76
                                                          337/276
9,136,617 B2    9/2015 Sakae
(Continued)

FOREIGN PATENT DOCUMENTS

CN    102863921 A    1/2013
CN    108780863 A    11/2018
(Continued)

OTHER PUBLICATIONS

Machine translation of description, including paragraph numbers, of Suk et al. reference KR20140028943A Secondary Battery With Improved Safety, corresponding to the original KR20140028943A foreign patent reference provided in the May 24, 2021 IDS (Year: 2014).*

(Continued)

*Primary Examiner* — Jessie Walls-Murray
(74) *Attorney, Agent, or Firm* — Birch, Stewart, Kolasch & Birch, LLP

(57) ABSTRACT

A battery module includes a plurality of battery cells, and a bus bar for electrically connecting the plurality of battery cells, wherein the bus bar includes a bus bar body and a safety unit inserted into a part of the bus bar body and surrounded by the bus bar body, and wherein the safety unit includes a volumetric expansion resin, a conductive material and an adhesive.

20 Claims, 3 Drawing Sheets

(51) Int. Cl.
*H01M 50/50* (2021.01)
*H01M 50/552* (2021.01)
*H01M 50/574* (2021.01)
*H01M 50/581* (2021.01)

(52) U.S. Cl.
CPC ....... *H01M 50/552* (2021.01); *H01M 50/574* (2021.01); *H01M 50/581* (2021.01); *H01M 2200/00* (2013.01); *H01M 2200/10* (2013.01); *H01M 2220/20* (2013.01)

(58) Field of Classification Search
CPC .......... H01M 50/581; H01M 2200/00; H01M 2220/20; H01M 50/209; H01M 50/507; H01M 2200/10; H01M 2200/106; H01M 50/505; H01M 50/07; H01M 50/503; H01M 50/583
See application file for complete search history.

(56) References Cited

U.S. PATENT DOCUMENTS

| | | | |
|---|---|---|---|
| 10,256,451 B2 | 4/2019 | Kim | |
| 10,381,633 B2 | 8/2019 | Golubkov | |
| 2004/0143042 A1* | 7/2004 | Tanaka | C08K 5/34928 524/100 |
| 2005/0266279 A1* | 12/2005 | Kim | H01M 50/559 429/57 |
| 2006/0215333 A1* | 9/2006 | Suzuki | H01M 50/581 361/15 |
| 2007/0246245 A1 | 10/2007 | Ahn et al. | |
| 2011/0070476 A1 | 3/2011 | Takahashi et al. | |
| 2013/0009105 A1 | 1/2013 | Higuchi et al. | |
| 2014/0065467 A1 | 3/2014 | Choi et al. | |
| 2015/0171413 A1* | 6/2015 | Schweinbenz | H01M 10/0525 429/61 |
| 2015/0243957 A1 | 8/2015 | Han et al. | |
| 2016/0248068 A1 | 8/2016 | Ha | |
| 2017/0250394 A1* | 8/2017 | Wakimoto | H01M 50/176 |
| 2017/0317377 A1 | 11/2017 | Inque et al. | |
| 2019/0081350 A1* | 3/2019 | Wang | H01M 4/624 |
| 2019/0109313 A1 | 4/2019 | Ryu et al. | |
| 2019/0280263 A1 | 9/2019 | Shin et al. | |
| 2019/0296309 A1* | 9/2019 | Yang | H01M 50/502 |
| 2021/0242548 A1 | 8/2021 | Lee et al. | |
| 2022/0037744 A1 | 2/2022 | Lee et al. | |

FOREIGN PATENT DOCUMENTS

| | | | |
|---|---|---|---|
| CN | 113632309 A | 11/2021 | |
| EP | 3 588 623 A1 | 1/2020 | |
| JP | 2000-149744 A | 5/2000 | |
| JP | 2007109548 A * | 4/2007 | |
| JP | 2007-194069 A | 8/2007 | |
| JP | 2007-280758 A | 10/2007 | |
| JP | 2013-14734 A | 1/2013 | |
| JP | 2014-122340 A | 7/2014 | |
| JP | 2014-519153 A | 8/2014 | |
| JP | 2016-157870 A | 9/2016 | |
| JP | 2019-537211 A | 12/2019 | |
| JP | 2021-525441 A | 9/2021 | |
| KR | 10-2013-0064031 A | 6/2013 | |
| KR | 10-2013-0080041 A | 7/2013 | |
| KR | 10-2014-0028943 A | 3/2014 | |
| KR | 10-2014-0125704 A | 10/2014 | |
| KR | 20140125704 A * | 10/2014 | H01M 50/502 |
| KR | 10-1494983 B1 | 2/2015 | |
| KR | 10-2015-0062694 A | 6/2015 | |
| KR | 10-2017-0021529 A | 2/2017 | |
| KR | 10-2017-0041131 A | 4/2017 | |
| WO | WO 2016/068071 A1 | 5/2016 | |
| WO | WO 2017/104435 A1 | 6/2017 | |
| WO | WO 2018/155281 A1 | 8/2018 | |

OTHER PUBLICATIONS

Matt Bishop, "The Cost and Performance Benefits of Switching From Metal to Plastic Parts", Manufacturing Tomorrow, Nov. 15, 2018, <https://www.manufacturingtomorrow.com/article/2018/11/the-cost-and-performance-benefits-of-switching-from-metal-to-plastic-parts/12494> (Year: 2018).*
Extended European Search Report for European Application No. 19896335.7, dated Dec. 9, 2021.
International Search Report for PCT/KR2019/013121 mailed on Feb. 4, 2020.

* cited by examiner

[FIG. 1]
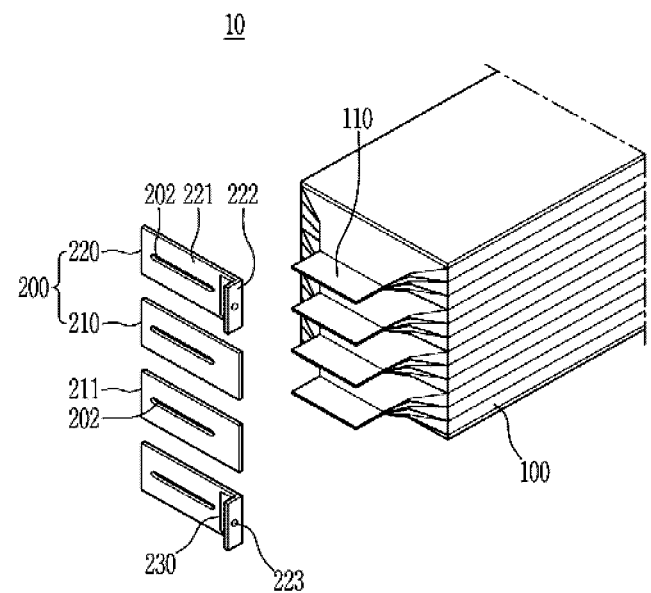

[FIG. 2]
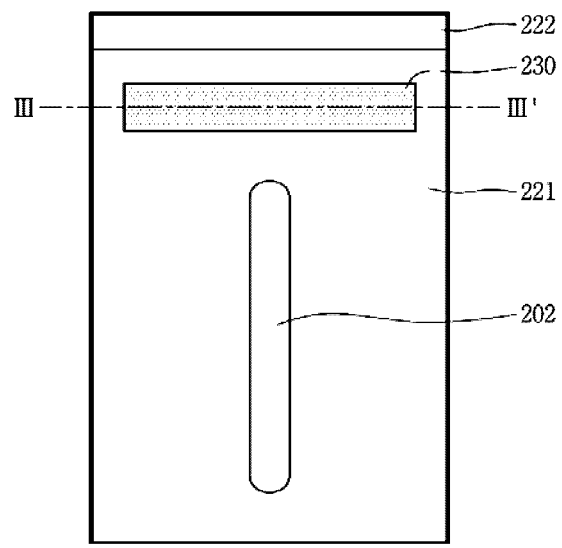
[FIG. 3]
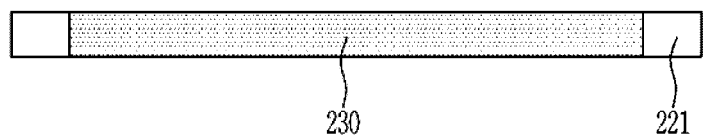

[FIG. 4]
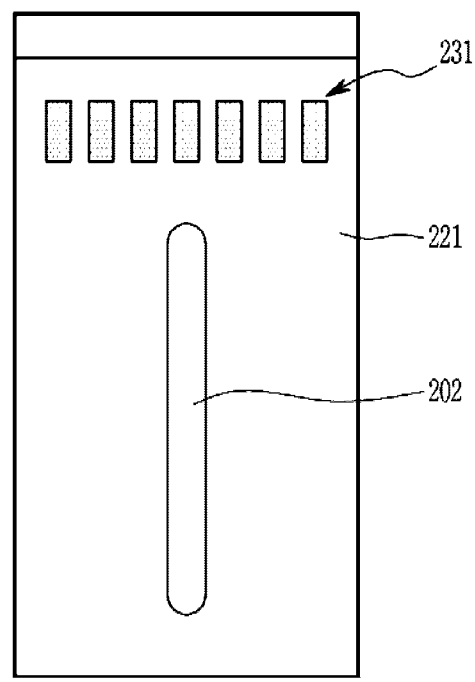

BATTERY MODULE

TECHNICAL FIELD

Cross Citation with Related Application(s)

This application claims the benefit of priority based on Korean Patent Application No. 10-2018-0161298 filed on Dec. 13, 2018, the disclosure of which is incorporated herein by reference in its entirety.

The present disclosure relates to a battery module, and more particularly to a battery module including a bus bar with improved safety.

BACKGROUND ART

Since secondary batteries are easily applied to various product groups and has electrical characteristics such as high energy density, it is universally applied not only for a portable device but also for an electric vehicle (EV) or a hybrid electric vehicle (HEV), an energy storage system or the like, which is driven by an electric driving source. The secondary battery is attracting attention as a new environment-friendly energy source for improving energy efficiency since it gives a primary advantage of remarkably reducing the use of fossil fuels and also does not generate by-products from the use of energy at all.

A battery pack for use in electric vehicles has a structure in which a plurality of cell assemblies, each including a plurality of unit cells, are connected in series to obtain a high output. In addition, the unit cell can be repeatedly charged and discharged by electrochemical reactions among components, which include a positive electrode current collector, a negative electrode current collector, a separator, an active material, an electrolyte and the like.

Meanwhile, as the need for a large capacity structure is increasing along with the utilization as an energy storage source in recent years, there is a growing demand for a battery pack with a multi-module structure in which a plurality of battery modules, each including a plurality of secondary batteries connected in series and/or in parallel, are integrated.

Meanwhile, when a plurality of battery cells are connected in series or in parallel to configure a battery pack, it is common to configure a battery module composed of at least one battery cell first, and then configure a battery pack by using at least one battery module and adding other components. The number of battery cells included in the battery pack, or the number of battery cells included in the battery module may be variously set according to the required output voltage or the demanded charge/discharge capacity. The battery module set in this way includes a plurality of battery cells stacked on each other and a bus bar for electrically connecting electrode leads of the plurality of battery cells.

Such a middle or large-sized battery module is designed so that when the pressure inside the battery cell rises to ensure safety, the lead inside the cell is melted to cut off electric current. However, since it operates depending on whether the pressure inside the cell rises, there is a problem of a pouch deformation in the case of a pouch type cell. For this reason, even in middle or large-sized battery modules, when the temperature inside the cell rises, there is an increasing need for a means that can stably secure safety by cutting off electric current.

DETAILED DESCRIPTION OF THE INVENTION

Technical Problem

The present disclosure has been made to solve the above problems, and it is therefore an object to provide a battery module including a bus bar which can secure safety in the battery module by cutting off electric current in abnormal situations such as thermal runaway due to temperature rise, and at the same time, is not high in resistance under normal conditions and thus can maintain performance equivalent to the existing one.

However, the problem to be solved by the embodiments of the present disclosure is not limited to the above-described problems, and can be variously expanded within the scope of the technical idea included in the present disclosure.

Technical Solution

A battery module according to an exemplary embodiment of the present disclosure includes a plurality of battery cells, and a bus bar for electrically connecting the plurality of battery cells, wherein the bus bar includes a bus bar body, and a safety unit inserted into a part of the bus bar body and surrounded by the bus bar body, and wherein the safety unit includes a volumetric expansion resin, a conductive material and an adhesive.

The safety unit may have the same thickness as the bus bar body.

The volumetric expansion resin may include a material that generates gas in an environment at a predetermined temperature or higher.

The volumetric expansion resin may include melamine cyanurate.

The safety unit may be formed by mixing the volumetric expansion resin, the conductive material, and the adhesive.

By generating gas from the volumetric expansion resin in the environment at the predetermined temperature or higher, the electrical resistance of the safety unit can increase to cut off electric current.

In an environment below the predetermined temperature, the safety unit may have conductivity by the conductive material.)

The conductive material may be metal powder or carbon powder.

The predetermined temperature may be 110° C. to 120° C.

The bus bar includes a slit formed in the bus bar body, into which a lead extended from one of the plurality of battery cells is inserted; and a terminal connection part having a bent shape extending from one end of the bus bar body, and the safety unit may be located between a the slit and the terminal connection part.

The safety unit may have a shape in which a plurality of stripes are gathered.

The battery pack according to another exemplary embodiment of the present disclosure may include the above-mentioned at least one battery module, and a pack case configured to package the at least one battery module.

A device according to another exemplary embodiment of the present disclosure may include the above-mentioned at least one battery pack.

Advantageous Effects

According to the embodiments, it is possible to secure safety in the battery module by cutting off electric current in abnormal situations such as thermal runaway due to temperature rise, and at the same time, it is possible to improve the safety of the battery module by using a bus bar which is not high in resistance under normal conditions, and thus can maintain performance equivalent to the existing one.

BRIEF DESCRIPTION OF THE DRAWINGS

FIG. 1 is an enlarged view of a part of a battery module according to an exemplary embodiment of the present disclosure.

FIG. 2 is a front view illustrating a bus bar of the battery module shown in FIG. 1.

FIG. 3 is a view illustrating a cross section taken along line of the bus bar shown in FIG. 2.

FIG. 4 is a front view illustrating a bus bar according to another exemplary embodiment of the present disclosure.

DETAILED DESCRIPTION OF THE EMBODIMENTS

Hereinafter, various embodiments of the present disclosure will be described in detail with reference to the accompanying drawings so that those skilled in the art can easily implement them. The present disclosure may be modified in various different ways, and is not limited to the embodiments set forth herein.

Further, throughout the specification, when a part is referred to as "including" a certain component, it means that it can further include other components, without excluding the other components, unless otherwise stated.

Further, throughout the specification, when referred to as "planar", it means when a target portion is viewed from the top, and when referred to as "cross-sectional", it means when a target portion is viewed from the side of a cross section cut vertically.

FIG. 1 is an enlarged view of a part of a battery module according to an exemplary embodiment of the present disclosure.

Referring to FIG. 1, the battery module 10 according to an exemplary embodiment of the present disclosure includes a battery cell stack in which a plurality of battery cells 100 are stacked, and a bus bar 200 for electrically connecting the plurality of battery cells 100.

The individual battery cell 100 constituting the battery cell stack is for example a pouch type battery cell, and may have a shape in which an electrode assembly is accommodated in a pouch case. They can be electrically connected to each other. The electrode assembly may include a positive electrode plate, a negative electrode plate and a separator, and an electrode assembly having a known structure can be adopted, and so a detailed description thereof will be omitted here.

A pair of electrode leads 110 connected to the electrode assembly may be drawn to the outside of the pouch case, for example, in the same direction or opposite direction. In the figures of the present disclosure, only a pouch-type battery cell 100 having a shape in which a pair of electrode leads 110 are drawn in opposite directions are shown for convenience of illustration, but the battery cell 100 applied to the battery module according to the present disclosure is not necessarily limited thereto, and a pair of electrode leads 110 may be drawn in the same direction.

The battery cells 100 are stacked such that electrode leads 110 having the same polarity are located in the same direction. This is because, when the electrode leads 110 are electrically connected by using a bus bar 200, the electrode leads 110 having the same polarity must be connected to each other. As the electrode leads 110 having the same polarity are electrically connected to each other, the respective battery cells 100 are connected in parallel.

As the electrode lead 110, for example, a thin metal plate of aluminum (Al) material coated with nickel (Ni) may be used. In order to facilitate the welding work for coupling these electrode leads 110 and bus bars 200, the surface of the electrode leads 110 may be coated with tin (Sn).

The bus bar 200 is for electrically connecting the electrode leads 110 provided in each battery cell 100 and may include a slit 202 into which the electrode leads 110 can be inserted. The electrode leads 110 inserted into the slit 202 may be bent so that the electrode leads 110 and the bus bars 200 are in surface contact with each other, which are then connected by welding or the like, thereby achieving an electrical connection.

The bus bar may include a first bus bar 210 used to connect the battery cells 100 in the battery module 10 in parallel, and a second bus bar 220 used to electrically connect the battery module 10 to an external terminal. The first bus bar 210 may include a planar bus bar body 211 and a slit 202 formed therein as shown in FIG. 1, but the structure is not limited thereto. In other words, a shape including a plurality of slits in one body, and additional holes and protrusions for coupling with components other than electrode leads can be included, which can be appropriately modified as needed. As shown in FIG. 1, a second bus bar 220 may include a bus bar body 221 including a slit 202, and a terminal connection part 222 configured by being extended from one end of the bus bar body 221 and bent so as to be substantially perpendicular to the bus bar body 221 in a direction opposite to the battery module 100. The terminal connection part 222 may include one or more holes 223 that can be connected to external terminals.

The bus bar 200 is coupled to a bus bar frame (not shown) or the like, and a module frame (not shown) accommodating a battery cell stack is coupled with the bus bar frame, so that the bus bar 200 can be coupled with an electrode lead 110, without being not particularly limited.

FIG. 2 is a front view illustrating a bus bar of the battery module shown in FIG. 1, and FIG. 3 is a view illustrating a cross section taken along line III-III' of the bus bar shown in FIG. 2.

Referring to FIGS. 1, 2, and 3, the bus bar 200 (in this embodiment, the second bus bar 220 will be described as an example) includes a safety unit 230 inserted into a part of the bus bar body 221 and surrounded by the bus bar body 221.

The safety unit 230 includes a volumetric expansion resin, a conductive material, and an adhesive. That is, the safety unit 230 may be formed by filling paste-like materials in which the volumetric expansion resin, the conductive material and the adhesive are mixed, in a space (hole) formed in the bus bar body 221, and then curing the same. For this reason, the safety unit 230 may have the same thickness as the bus bar body 221.

The volumetric expansion resin included in the safety unit 230 includes materials that generates gas in an environment at a predetermined temperature or higher, specifically, an environment at 110° C. to 120° C. or higher. That is, the volumetric expansion resin is a material that can be thermally decomposed at a temperature of 110° C. to 120° C. or more to generate gas. Examples of such volume expansion resins include melamine cyanurate.

The conductive material included in the safety unit 230 may be a conductive powder, for example, a metal powder or a carbon powder. Examples of the metal powder may include silver, aluminum, gold, lead and the like, but are not particularly limited. The conductive powder can be used by mixing with an adhesive, or a commercially available metal paste may be mixed with the volumetric expansion resin and the adhesive described later, thereby forming a safety unit 230. Since the safety unit 230 includes such a conductive material, it allows current to be smoothly transmitted without causing an increase in resistance of the bus bar 200 by the safety unit 230 when the battery module operates normally (that is, when no abnormal temperature rise occurs).

The adhesive included in the safety unit 230 is not particularly limited as long as it is a resin that can be mixed with the volumetric expansion resin and the conductive material to form a paste and be cured. For example, an epoxy resin or the like can be used.

The volumetric expansion resin, the conductive material, and the adhesive are mixed and made in the form of a paste, which is then filled into a space (hole) formed in the bus bar body 221 and then cured, thereby forming a safety unit 230. The volumetric expansion resin included in the safety unit 230 is thermally decomposed to generate gas when the temperature inside the battery module is abnormally increased (thermal runaway) to be 110° C. to 120° C. or more. For example, when melamine cyanurate is used as the volumetric expansion resin, nitrogen gas is generated by thermal decomposition. When gas is generated in this way, the safety unit 230 expands and resistance increases. That is, since the safety unit 230 acts as a resistance layer and resistance increases between both sides around the safety unit 230, the current does not flow or the amount of flowing current decreases. Therefore, when a sudden temperature rise occurs due to an abnormal operation, it is possible to efficiently cut off electric current to improve the safety of the battery module.

In addition, when the safety unit 230 is formed by mixing the volumetric expansion resin, the conductive material, and the adhesive as shown in FIG. 3, the safety unit 230 may be formed to the same thickness as the bus bar body 221. Therefore, even if the safety unit 230 is added, the structure itself of the conventional bus bar 200 does not change, and therefore, the configuration of the safety unit 230 can be easily adopted without changing the design.

In FIG. 2, the safety unit 230 included in the second bus bar 220 has been described as an example, but the safety unit 230 may be included in a first bus bar 210, and it may also be employed for the safety of other components employed for electrical connection, without being particularly limited. However, when the safety unit 230 is located in the vicinity of the terminal connection part 222 connected to an external terminal, the current flow to the outside is cut off, and thus, there is an advantage in that the effect of cutting off electrical current can be achieved more quickly and effectively for the entire battery module 10. That is, as shown in FIG. 2, the safety unit 230 may be located between the slit 202 and the terminal connection part 222. Thereby, the electrical connection to the entire battery module 10 from the outside can be quickly cut off even by using the safety unit 230 with a smaller amount and a smaller area.

FIG. 4 is a front view illustrating a bus bar according to another exemplary embodiment of the present disclosure.

Referring to FIG. 4, the bus bar 200 according to another exemplary embodiment of the present disclosure may include a safety unit 231 formed in a form in which a plurality of stripes are gathered. Other configurations except for the shape of the safety unit 231 are the same as in the previous embodiment, and so a description thereof will be omitted here.

The safety unit 231 included in the bus bar 200 of the present embodiment has a shape in which a plurality of stripes are gathered, which may be formed by a process in which a plurality of pattern-shaped holes are formed in the bus bar body 221, and then filled with a paste obtained by mixing the volumetric expansion resin, the conductive material and the adhesive, followed by curing. According to this, each region filled with the paste is narrow, and therefore, even if the viscosity of the paste is slightly diluted, it is possible to form the safety unit 231 without being affected by this, thereby improving workability.

In addition, when the temperature rises abnormally by such a shape, thermal decomposition by the volumetric expansion resin sufficiently occurs in the region where the safety unit 231 is formed, the current cutting off effect due to the safety unit 231 can be achieved in a similar manner.

Meanwhile, one or more battery modules according to an exemplary embodiment of the present disclosure may be packaged in a pack case to form a battery pack.

The above-mentioned battery module and a battery pack including the same may be applied to various devices. These devices may be applied to vehicles such as an electric bicycle, an electric vehicle, a hybrid vehicle, but the present disclosure is not limited thereto and can be applied to various devices that can use the battery module and the battery pack including the same, which also belongs to the scope of the present disclosure.

Although the preferred embodiments of the present disclosure have been described in detail above, the scope of the present disclosure is not limited thereto, and various modifications and improvements of those skilled in the art using the basic concepts of the present disclosure defined in the following claims also belong to the scope of rights.

| [DESCRIPTION OF REFERENCE NUMERALS] | |
|---|---|
| 10: battery module | 100: battery cell |
| 110: electrode lead | 200: bus bar |
| 210: first bus bar | 220: second bus bar |
| 230, 231: safety unit | 202: slit |
| 211, 221: busbar body | 222: terminal connection part |
| 223: hole | |

The invention claimed is:

1. A battery module comprising:
a plurality of battery cells, and
a bus bar for electrically connecting the plurality of battery cells,
wherein the bus bar includes a bus bar body, and a safety unit inserted into a part of the bus bar body and surrounded by the bus bar body,
wherein the safety unit includes a volumetric expansion resin, a conductive material and an adhesive mixed together,
wherein the bus bar body is a plate having a top surface, a bottom surface and an edge extending about a perimeter of the plate,
wherein the bus bar has at least one opening extending through the top surface and bottom surface, a width of the opening being less than a width of the bus bar body, and
wherein the safety unit is in the at least one opening, an entire perimeter of the safety unit being spaced from the perimeter of the bus bar body.

2. The battery module of claim 1, wherein the safety unit has a same thickness as the bus bar body.

3. The battery module of claim 1, wherein the volumetric expansion resin includes a material that generates gas in an environment at a predetermined temperature or higher.

4. The battery module of claim 3, wherein by generating gas in an environment at the predetermined temperature or higher, electrical resistance of the safety unit increases to cut off electric current.

5. The battery module of claim 3, wherein in an environment below the predetermined temperature, the safety unit has conductivity by the conductive material.

6. The battery module of claim 5, wherein the conductive material is a metal powder or a carbon powder.

7. The battery module of claim 3, wherein the predetermined temperature is 110° C. to 120° C.

8. The battery module of claim 1, wherein the volumetric expansion resin includes melamine cyanurate.

9. The battery module of claim 1, wherein the safety unit is formed by mixing the volumetric expansion resin, the conductive material, and the adhesive.

10. The battery module of claim 1, wherein the bus bar includes a slit formed in the bus bar body, into which a lead extended from one of the plurality of battery cells is inserted, and a terminal connection part having a bent shape extending from one end of the bus bar body, and the safety unit is located between the slit and the terminal connection part.

11. The battery module of claim 1, wherein the safety unit has a shape in which a plurality of stripes are gathered.

12. A battery pack comprising at least one battery module according to claim 1, and a pack case configured to package the at least one battery module.

13. A device comprising at least one battery pack according to claim 12.

14. The battery module of claim 1, wherein the at least one opening is a plurality of openings, the safety unit being in each of the plurality of openings.

15. The battery module of claim 1, wherein the bus bar body is rectangular.

16. The battery module of claim 1, wherein the perimeter of the bus bar body has a first side edge and a second side edge spaced from the first side edge in a first direction, a distance between the first side edge and the second side edge in the first direction defining a width of the bus bar body, and wherein the width of the opening is in the first direction so that the opening is spaced from the first side edge and the second side edge.

17. The battery module of claim 16, wherein a width of the safety unit in the first direction is less than the width of the bus bar body.

18. The battery module of claim 17, wherein the bus bar body is rectangular.

19. The battery module of claim 1, wherein the bus bar body has a pair of side edges spaced from each other in a first direction, wherein the safety unit is elongated in the first direction, and wherein the safety unit is spaced from each pair of side edges to form a pair of bridges between ends of the safety unit and the pair of side edges, respectively.

20. The battery module of claim 1, wherein the bus bar body has a constant width.

* * * * *